(12) United States Patent
Nonaka et al.

(10) Patent No.: US 6,320,833 B1
(45) Date of Patent: Nov. 20, 2001

(54) RECORDING APPARATUS AND METHOD, AND REPRODUCING APPARATUS AND METHOD

(75) Inventors: Chiaki Nonaka, Kanagawa; Seiji Ohbi; Makoto Yamada, both of Tokyo; Masahiro Shigenobu, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/298,515

(22) Filed: Apr. 23, 1999

(30) Foreign Application Priority Data

May 7, 1998 (JP) .................................................. 10-12495
May 7, 1998 (JP) ................................................. 10-124920

(51) Int. Cl.[7] ...................................................... G11B 5/09
(52) U.S. Cl. .................................... 369/53.25; 369/53.31; 369/53.37; 369/47.3; 369/47.33; 369/47.54
(58) Field of Search ............................. 369/53.38, 53.25, 369/53.24, 53.29, 53.31, 53.36, 53.37, 47.23, 47.24, 47.29, 47.3, 47.33, 47.34, 47.54

(56) References Cited

U.S. PATENT DOCUMENTS 4,389,681 * 6/1983 Tanaka et al. ..................... 369/59.26
5,249,271    9/1993 Hopkinson et al. ................. 395/250
5,432,769 * 7/1995 Honjo ................................. 369/47.33
5,471,450   11/1995 Yonemitsu et al. .................... 369/60
5,508,995    4/1996 Moriya et al. .................... 369/275.4
5,634,031 * 5/1997 Sakuma ............................. 369/53.22
5,715,424    2/1998 Jesionowski et al. ............... 395/440
5,844,882   12/1998 Yoshida et al. ................... 369/275.4
5,844,883 * 12/1998 Kanno et al. ..................... 369/275.4
5,959,947 * 9/1999 Inoue et al. ............................ 369/32

OTHER PUBLICATIONS

"Sony: 4XDensity Data MD" Minidisc Community Page, Sony Technology/Research and Development, Dec. 16, 1996, pp. 1–4.
Patent Abstracts of Japan, JP 8–212703, Published Aug. 20, 1996, Alpine Electronics Inc.
Derwent Publications Ltd., Database WPI, Week 9817, JP 10–040549, Published Feb. 13, 1998, Sony Corporation.

* cited by examiner

Primary Examiner—Thang V. Tran
(74) Attorney, Agent, or Firm—Oblon, Spivak, McClelland, Maier & Neustadt, P.C.

(57) ABSTRACT

A reproducing apparatus for reading, or a recording apparatus for writing, data from or to a disc having pre-formed thereon a pair of concentrical or spiral tracks adjacent to each other and to which a common address is given, is adapted to control the time at which a read or write head is moved from one to the other of the pair of tracks or vice versa.

17 Claims, 9 Drawing Sheets

RECORDING APPARATUS AND METHOD, AND REPRODUCING APPARATUS AND METHOD

BACKGROUND OF THE INVENTION

1. Field of the Invention

The present invention relates to an apparatus for, and a method of, recording data to a disc having formed thereon alternately a track of which both walls are wobbled at a predetermined frequency and a track of which both walls are flat, and an apparatus for, and a method of, reproducing data recorded on the disc.

2. Description of Related Art

Optical discs in which program data, video data, audio data or the like is recorded are represented by compact discs (CD), for example.

Recently, it is expected that a medium appears into which the user can record a program data, video data, audio data, etc.

Currently, a mini disc (MD) is known to which a compressed audio signal can be recorded. The MD has a recording capacity as small as 140 MB and so it is suitably usable for recording audio data. However, this recording capacity is insufficient for recording video data and computer data.

In these situations, an magneto-optical disc has newly been proposed which has a recording capacity of 640 MB. This new disc is called "MD-DATA2" disc.

In the conventional MD, grooves wobbled at a frequency of 22.05 kHz are pre-formed on the disc and an address information is recorded as modulated at 22.05 kHz.

In the newly proposed MD-DATA2 to which the present invention is applied, a wobbled groove and non-wobbled groove are formed alternately as shown in FIG. 1 and data is recorded on a land between the wobbled and non-wobbled grooves.

As shown in FIG. 2, there are formed on the MD-DATA2 disc a first land TrA of which one lateral face is wobbled at a predetermined frequency while the other lateral face is flat and a second land TrB of which one lateral face is flat while the other lateral face is wobbled at a predetermined frequency.

Namely, there has not ever been proposed any MD in which data is recorded on two tracks having different physical properties.

SUMMARY OF THE INVENTION

It is therefore an object of the present invention to provide a recording apparatus and method, and a reproducing apparatus and method, in which during write of data on two tracks different in physical properties from each other, a time of switching between the two tracks in pair is controlled.

The above object can be attained by providing a recording method in which data is written to a disc having formed thereon a pair of concentrical or spiral tracks adjacent to each other and to which a common address is given, comprising, according to the present invention, the steps of:

writing a data blocked to a predetermined length to one of the pair of tracks;

accessing the other track having the common address after the write of the data blocked to the predetermined length to the one track; and writing a data blocked to a new predetermined length to the other one of the pair of tracks after the access to that track.

Also, the above object can be attained by providing a recording apparatus adapted to write data to a disc having formed thereon a pair of concentrical or spiral tracks adjacent to each other and to which a common address is given, comprising, according to the present invention:

means for blocking an input data to a predetermined length;

means for writing the blocked data to the disc; and means for controlling the recording means to access one of the pair of tracks and write the blocked data to the track, and then access the other one of the pair of tracks that has the common address after the write to the one track and write a data blocked to a new predetermined length to the other track.

The above object can be attained also by providing a recording apparatus adapted to write data to a disc having formed thereon a pair of concentrical or spiral tracks adjacent to each other and to which a common address is given, comprising, according to the present invention:

a memory means for storing an input data once at a first transfer rate;

a memory controlling means for detecting when the data amount stored in the memory means has exceeded a first predetermined value, reading out data from the memory means at a second transfer rate higher than the first transfer rate and stopping the data read-out from the memory means when the data amount stored in the memory means has reached a second predetermined value smaller than the first predetermined value;

a writing means for writing data read out from the memory means;

a recording means movement controlling means for moving, while the data read-out from the memory means is being stopped, the writing means from one of the pair of tracks to which the data read out from the memory means has been written to the other one of the pair of tracks; and a writing means controlling means for stopping the writing means from writing while the data read-out from the memory means is being stopped.

Further, the above object can be attained by providing a reproducing apparatus adapted to read data from a disc having formed thereon a pair of concentrical or spiral tracks adjacent to each other and to which a common address is given, comprising, according to the present invention:

means for reading data from the disc;

a memory means for storing the data read out from the memory means once at a first transfer rate;

a memory controlling means for detecting when the data amount stored in the memory means has exceeded a first predetermined value, reading out data from the memory means at a second transfer rate higher than the first transfer rate and stopping the data storage into the memory means when the data amount stored in the memory means has reached a second predetermined value smaller than the first predetermined value; and a writing means movement controlling means for moving, while the data storage into the memory means is being stopped, the reading means from one of the pair of tracks from which the data has been read to the other one of the pair of tracks.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

For the convenience of the illustration and description of the present invention, the description of an embodiment of magneto-optical disc drive unit to which the present invention is applied will be divided into the following sections:

1. Magneto-optical disc to which the present invention is applied
2. Magneto-optical disc drive unit to which the present invention is applied
3. First embodiment of the present invention
4. Second embodiment of the present invention 1. Magneto-Optical Disc to Which the Present Invention is Applied As a recording medium, a magneto-optical disc adopting the so-called MD-DATA2 format is used in the magneto-optical disc drive unit for the purpose of describing the present invention.

Figure 1:
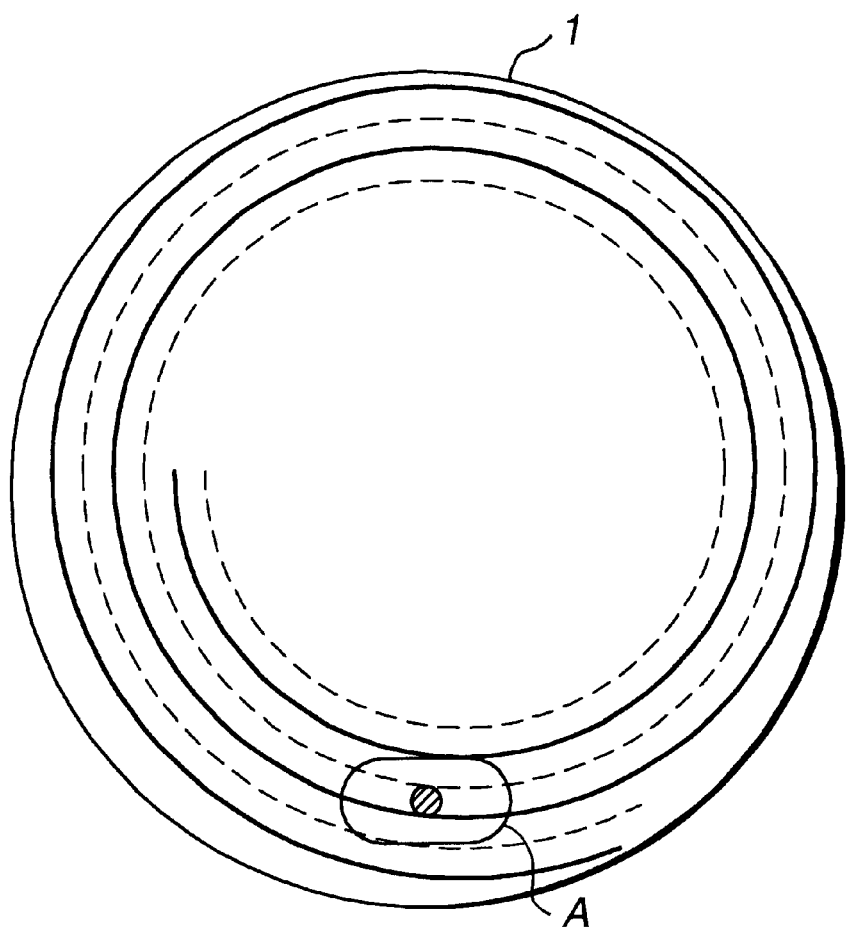
FIG. 1 is a schematic illustration of a magneto-optical disc according to the present invention, showing the shapes of tracks formed on the disc.
Figure 2:
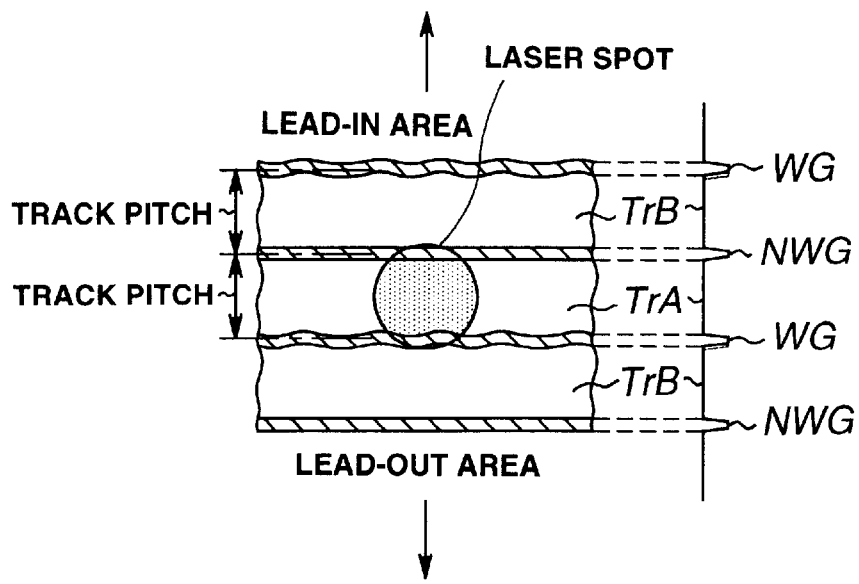
FIG. 2 is a schematic illustration of the magneto-optical disc according to the present invention, showing the shapes of tracks formed on the disc.

FIG. 1 shows the shape of a recording track formed on the magneto-optical disc, and FIG. 2 shows a view, enlarged in scale, of a portion A, in FIG. 1, of the recording track on the magneto-optical disc. The magneto-optical disc 1 is a disc-shaped recording medium of about 64 mm in diameter and 1.2 mm in thickness and in which data is recorded by the magneto-optical recording method.

The magneto-optical disc 1 adopting the MD-DATA2 format to which the present invention is applied has a recording density improved by reducing the recording track pitch to 0.95 µm (1.6 µm in the magneto-optical disc adopting the conventional MD-DA (digital and audio) format.

The magneto-optical disc 1 has formed on a recording surface thereof a spiral land and groove from the lead-in to lead-out area. In this magneto-optical disc 1, the land is a recording track on which data is recorded.

Also, in this magneto-optical disc 1, the track has a so-called double-spiral form. Namely, a pair of two parallel-disposed lands being the recording tracks is spirally formed on the recording surface of the magneto-optical disc 1.

On the pair of recording tracks, the inner one is assumed as a recording track TrA while the outer one is assumed as a recording track TrB.

A wobble groove WG or a non-wobbled groove NWG is between the recording tracks TrA and TrB.

More particularly, the non-wobbled groove NWG is adjacent to the inner side of the recording track TrA and the wobbled groove WG is adjacent to the inner side of the recording tack TrB, as will be seen from FIGS. 1 and 2.

That is, the wobbled groove WG is formed between the inner sides of the pair of recording tracks TrA and TrB forming together a spiral, and the non-wobbled grooves NWG are formed on the outer sides of the pair of spiral recording tracks TrA and TrB.

The wobbled groove WG includes a wobbling line corresponding to a signal produced by frequency or biphase modulation of a physical address on the magneto-optical disc 1.The recording and/or reproducing apparatus for write to or read from the magneto-optical disc 1 is adapted to detect a wobble signal corresponding to a wobbling line included in the wobbled groove WG, demodulate it and thus extract an information on a physical address on the magneto-optical disc 1.

Since the wobbled groove WG is formed between the pair of recording tracks TrA and TrB forming together the spiral, the recording tracks TrA and TrB in pair have a same address in common.

In the magneto-optical disc 1, because the wobbled groove WG is thus formed, a wobble signal can be detected from a wobbled groove with less crosstalk with a wobble signal from other wobbled grooves WG and the recording track pitch can be reduced.

Figure 3:
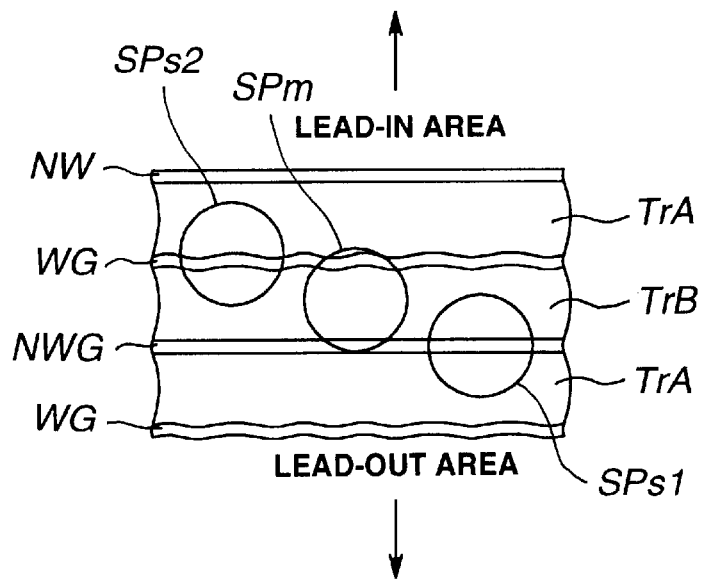
FIG. 3 is also a schematic illustration of the magneto-optical disc according to the present invention, showing the shape of a laser beam focused on the track on the disc.

Note that the recording tracks TrA and TrB to which a same address information is given are discriminated from each other as will be described below:

Namely, for discrimination of the recording track TrA from TrB, it suffices to use two side beams for detection of a wobble signal in addition to a main beam for data write or read with respect to the magneto-optical disc 1 as shown by way of example in FIG. 3.

When a beam spot SPS of the main beam is on a predetermined recording track, beam spots SPs1 and SPs2 of the two side beams, respectively, are focused on a groove adjacent to the recording track.

For example, when the beam spot SPS of the main beam is on the recording track TrA, the beam spot SPs1 of the side beam at the lead-out side is focused on the wobbled groove WG while the beam spot SPs2 of the side beam at the lead-in side is focused on the non-wobbled groove NWG.

On the other hand, when the beam spot SpS of the main beam is on the recording track TrB, the beam spot SPs1 of the side beam at the lead-out side is focused on the non-wobbled groove NWG while the beam spot SPs2 of the side beam at the lead-in side is focused on the wobbled groove WG.

That is, in the magneto-optical disc 1, the beam spots SPs1 and SpS2 of the two side beams are focused are focused on either the wobbled groove WG and non-wobbled groove NWG or on the non-wobbled groove NWG and wobbled groove WG, respectively, depending upon whether the beam spot SPS of the main beam is focused on the recording track TrA or TrB.

Thus, the recording tracks TrA and TrB on the magneto-optical disc 1, to which a same address information is given in common, can be discriminated from each other by judging whether any of the beam spots SPs1 and SpS2 of the side beams is focused on the wobbled groove WG (or non-wobbled groove NWG).

A laser light having f a wavelength λ of 650 nm is focused onto the recording track on the magneto-optical disc 1 through an objective lens of 0.52 in numerical aperture (NA). Data is recorded on the recording track at a transfer rate of 589 kB /s and at a constant linear velocity of 2.0 m/s. Data is recorded in a bit length of 0.29 μm on the recording track.

Also, data is recorded on the recording track on the magneto-optical disc 1 by the 1-7RLL (run length limited) modulation method, RS-PC (Reed-Solomon—product code) error correction method and the block deinterleaving method. As a result, the magneto-optical disc 1 has a redundancy of 19.7% and thus a total recording capacity of about 650 MB.

In the magneto-optical disc 1, one address area recorded as the wobbled groove WG forms one sector. Each such sector is formed at every about 6.9 mm along the recording track.

In the magneto-optical disc 1, recording areas for 16 sectors form one cluster. A data in one error correction code (ECC) block is recorded in each such cluster.

Therefore, a data in one ECC block which is a unit for data rewrite is recorded in one cluster in the magneto-optical disc 1 for matching between the physical address and data amount to be recorded. Note that in the magneto-optical disc 1, the data amount in one ECC block is 32,768 bytes.

The specifications of the magneto-optical disc 1 are collectively shown in

TABLE 1

| Disc diameter | 64 mm |
|---|---|
| Disc thickness | 1.2 mm |
| Track pitch | 0.95 μm |
| Bit length | 0.39 μm/bit |
| λ · NA | 650 nm · 0.52 |
| Recording method | On-land recording |
| Addressing method | Interlaced addressing (one wobbling of double spiral) |
| Modulation method | RLL(1, 7) |
| Error correction method | RS-PC |
| Interleaving | Block |
| Redundancy | 19.7% |
| Linear velocity | 2.0 m/s |
| Data rate | 589 kB/s |
| Recording capacity | 650 MB |

The magneto-optical disc 1 specified as in Table 1 can record data at a high density. For example, data compressed by the MPEG (Moving Picture coding Experts Group) 2 can be recorded into this magneto-optical disc 1 for a time of 15 to 17 min.

2. Magneto-Optical Disc Drive Unit to Which the Present Invention is Applied

The magneto-optical disc drive unit to which the present invention is applied to write and/or read data to and/or from the aforementioned magneto-optical disc 1, will be described herebelow.

Figure 4:
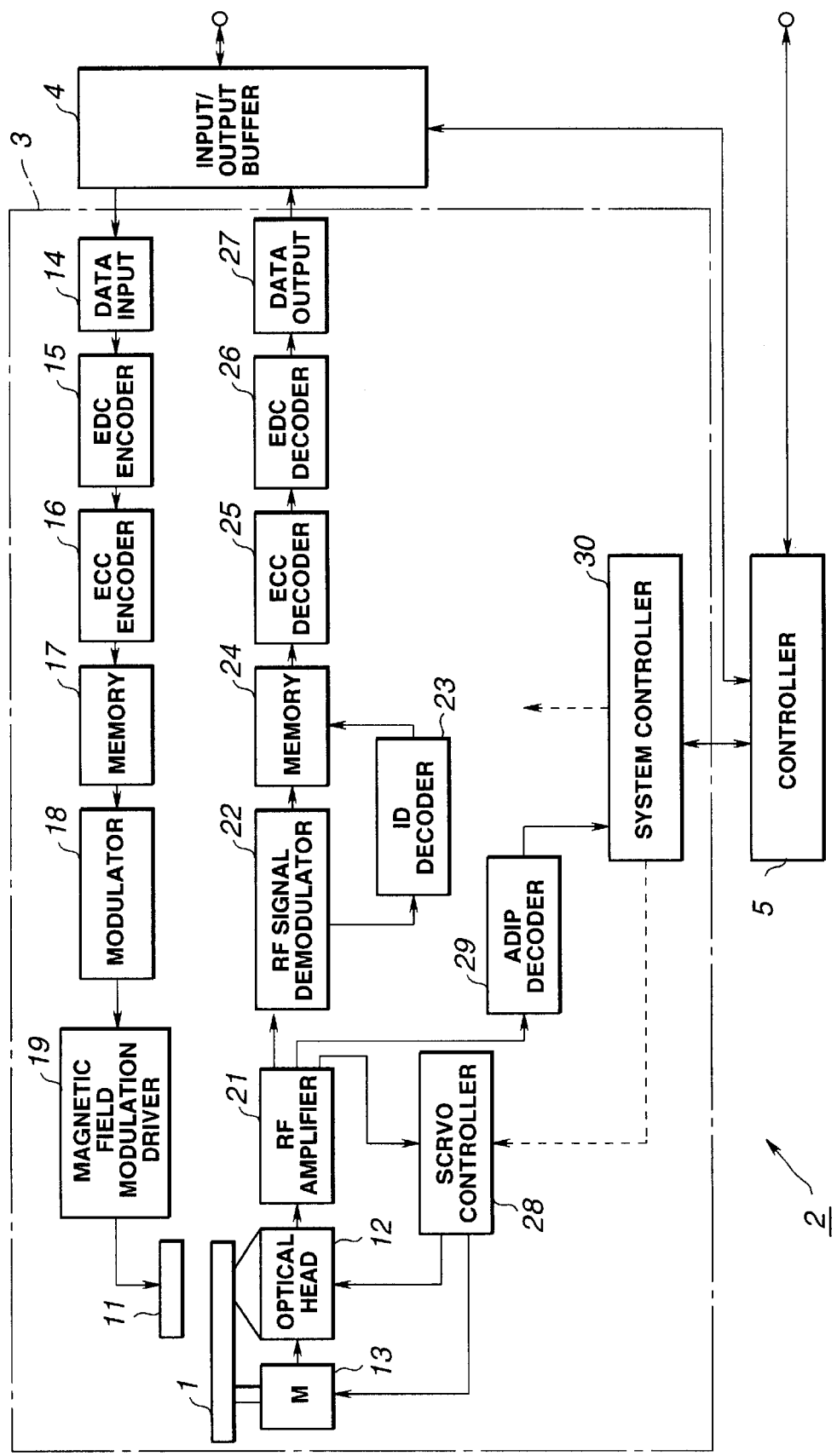
FIG. 4 is a schematic block diagram of a recording and/or reproducing apparatus according to the present invention.

FIG. 4 is a schematic block diagram of the magneto-optical disc drive unit to which the present invention is applied. The magneto-optical disc drive unit is generally indicated with a reference 2. The magneto-optical disc drive unit 2 comprises a magnetic head 11 to give a modulating magnetic field to the magneto-optical disc 1, an optical head 12 to emit a laser light to the magneto-optical disc 1 for data write or read to or from the magneto-optical disc 1, and a spindle motor 13 to drive to spin the magneto-optical disc 1.

The magneto-optical disc drive unit 2 further comprises, in its recording system, a data input circuit 14, ID (identification) code/EDC (error detecting coding) encoder 15, ECC (error correction encoding) encoder 16, memory 17, modulator 18 and a magnetic field modulation drive 19.

The magneto-optical disc drive unit 2 further comprises, in its reproducing system, an RF amplifier 21, RF signal modulator 22, ID decoder 23, memory 24, ECC decoder 25, EDC decoder 26 and a data output circuit 27.

Further, the magneto-optical disc drive unit 2 comprises a servo controller 28 in its servo system.

Moreover, the magneto-optical disc drive unit 2 comprises an ADIP (address in pre-groove) decoder 29 to detect a wobble signal recorded as wobbled groove n the magneto-optical disc 1 in order to detect a physical address information on the magneto-optical disc 1, and also a system controller 30 to control the recording and reproducing systems, servo controller 28, etc.

For data recording, the magneto-optical disc drive unit 2 constructed as in the above functions as will be described below:

The magneto-optical disc drive unit 2 is supplied, from an external equipment such as a camera, video tape recorder, satellite broadcasting step top box (STB), etc. for example, with a data to be written to the magneto-optical disc 1. The to-be-recorded data is supplied to the data input circuit 14, and then to the ID/EDC encoder 15 from the data input circuit 14.

In the ID/EDC encoder 15, an ID information of the to-be-recorded data supplied to the ID/EDC encoder 15 and an error detecting code (EDC) for detecting an error in the supplied to-be-recorded data are added to the supplied to-be-recorded data.

The to-be-recorded data having the ID information and EDC added thereto is supplied to the ECC decoder 16 in which an error correction code is added in a predetermined error correction block to the supplied to-be-recorded data. The to-be-recorded data having the ECC added thereto is stored once into the memory 17.

In the memory 17, the to-be-recorded data stored in the memory 17 is subjected to absorption of a time gap due to a difference between a transfer rate at which the to-be-recorded data has been transferred from an external device to the magneto-optical disc drive unit 2 and a rate at which the data is to be written to the magneto-optical disc 1, and then supplied to the modulator 18.

The modulator 18 modulates the supplied to-be-recorded data by a predetermined modulation method. The modulated to-be-recorded data is supplied to the magnetic field modulation driver 19.

The magnetic field modulation driver 19 drives, correspondingly to the supplied to-be-recorded data, the magnetic head 11 to magneto-optically write the supplied data to the recording track on the magneto-optical disc 1.

For data recording, the magneto-optical disc drive unit 2 functions as will be described below:

In the magneto-optical disc drive unit 2, the optical head 12 reads a data recorded on the recording track on the magneto-optical disc 1, and supplies a read signal to the RF amplifier 21 in which the signal read from the magneto-optical disc 1 is amplified and otherwise processed, and then supplied to the RF signal demodulator 22.

The RF signal demodulator 22 effects a binary coding, demodulation and other processing of the read signal to reproduce a data. The reproduced data generated by the RF signal demodulator 22 is stored once into the memory 24.

The reproduced data generated by the RF signal demodulator 22 is supplied to the ID decoder 23 as well. The ID decoder 23 detects an ID information from the reproduced data. The detected ID information is stored along with the reproduced data indicated by the ID information once into the memory 24.

In the memory 24, the reproduced data stored in the memory 24 is subjected to absorption of a time gap due to a difference between a rate at which the data has been read from the magneto-optical disc 1 and a transfer rate at which the data is to be transferred from the magneto-optical disc drive unit 2 to an external device, and then supplied to the ECC decoder 25. The ECC decoder 25 corrects the reproduced data based on the ECC added in the predetermined error correction block. The error-corrected reproduced data is supplied to the EDC decoder 26 which detects an error in the reproduced data based on the EDC added to the reproduced data. The reproduced data having an error detected therein is supplied to the data output circuit 27. The data output circuit 27 supplies the reproduced data to an external device such as a camera, video tape recorder, satellite broadcasting set top box (STB), etc. for example.

In the magneto-optical disc drive unit 2, the write or read operations are servo-controlled as will be described below:

Based on the signal detected by the optical head 12, the RF amplifier 21 generates a focus error signal indicative of whether a spot of laser light emitted from the optical head 12 is focused just on the recording surface of the magneto-optical disc 1, a tracking error signal indicative of whether the laser spot is focused just on the recording track, etc. The focus error signal, tracking error signal, etc. thus generated are supplied to the servo controller 28. Based on these focus error signal, tracking error signal, etc., the servo controller 28 controls the optical head 12 so that the spot of laser light from the optical head 12 is focused just on the recording surface and recording track, respectively.

Also, the servo controller 28 controls the speed of the spindle motor 13, based on a clock, etc. obtained from a wobble signal, etc. for example, so that data can be written or read at a constant linear velocity. Further, the servo controller 28 changes or controls the power of laser light emitted from the optical head 12 so that data write or read to or from the magneto-optical disc 1 can be done with an appropriate laser power.

Further, in the magneto-optical disc drive unit 2, an address information is detected from the magneto-optical disc 1 for data write or read as will be described below:

As having previously been described, the magneto-optical disc 1 has an address information recorded on the wobbled groove WG adjacent to the recording track (land). The RF amplifier 21 generates a so-called pushpull signal from a difference between the two side spots SPs 1 and SPs 2, for example.

The pushpull signal is supplied to the ADIP decoder 29 which will detect a wobble signal from the pushpull signal and decode the wobble signal to detect a physical address on the magneto-optical disc 1 to or from which data is currently written or read. The ADIP decoder 29 supplies the physical address to the system controller 30.

Also, the ADIP decoder 29 judges the polarity, etc. of the wobble signal to detect to or from which of the lead-in and lead-out recording tracks TrA and TrB formed as a so-called double spiral a data is currently being written or read.

This positional information of a recording tack is supplied to the system controller 30 which is also supplied with the address information detected by the ADIP decoder 29 as having previously been mentioned.

The system controller 30 is supplied also with information such as a read start address, write start address etc. from an external device, etc.

Based on these information, the system controller 30 generates a track jump signal under which the optical head 12 is moved radially of the magneto-optical disc 1, and supplies it to the servo controller 28.

Based on this track jump signal, the servo controller 28 move the optical head 12 radially of the magneto-optical disc 1 to focus the laser light onto a recording track at a predetermined address.

3. First Embodiment of the Present Invention

As having been described in the foregoing, the magneto-optical disc drive unit 2 can magneto-optically write a to-be-recorded supplied from an external device to the magneto-optical disc 1, and read a data from the magneto-optical disc 1 and supply it to an external device.

Next, data write to each of the recording tracks formed as the double spiral on the magneto-optical disc 1, will be described herebelow:

As mentioned in the foregoing, the magneto-optical disc 1 has the pair of parallel recording tracks TrA and TrB formed in the form of a so-called double spiral on the recording surface thereof.

In the magneto-optical disc drive unit 2, a switching point is predetermined and the lead-in side recording track TrA and lead-out side recording track TrB are switched between them at every such predetermined switching point.

Figure 5:
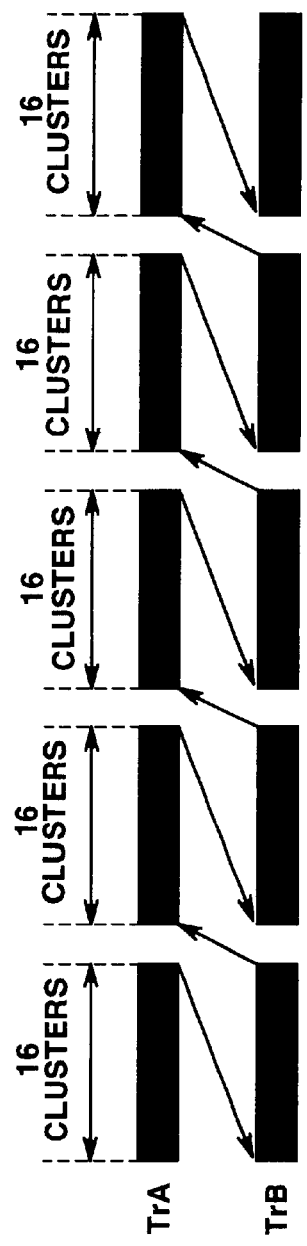
FIG. 5 is a schematic illustration of a first embodiment of the recording method according to the present invention.

More specifically, when having written data to one of the recording tracks TrA and TrB along a predetermined length thereof for 16 clusters, for example, as shown in FIG. 5, the magneto-optical disc drive unit 2 goes to the other recording track TrA or TrB.

The data amount recordable in one cluster is of 32,768 bytes which is equivalent to the data amount of one ECC block. The switching from one recording tack to the other is effected when data write has been made to a recording track length being an integral multiple of clusters. By fixing the data amount recorded by the magneto-optical disc drive unit 2, the switching between the recording tracks TrA and TrB can be done at a predetermined position even when a plurality of different applications is written to one magneto-optical disc 1 for example. Thus, the magneto-optical disc drive unit 2 cane be operated easily.

Since data is written to the magneto-optical disc 1 at a constant linear velocity, one cluster has a constant length of about 6.9 mm×16. Also, by setting a recording track length of an integral multiple of clusters to a switching point at which switching is made between the recording tracks TrA and TrB, the magneto-optical disc drive unit 2 can switch the recording track from TrA to TrB or vice versa at each fixed track length for data write or read.

Figure 6:
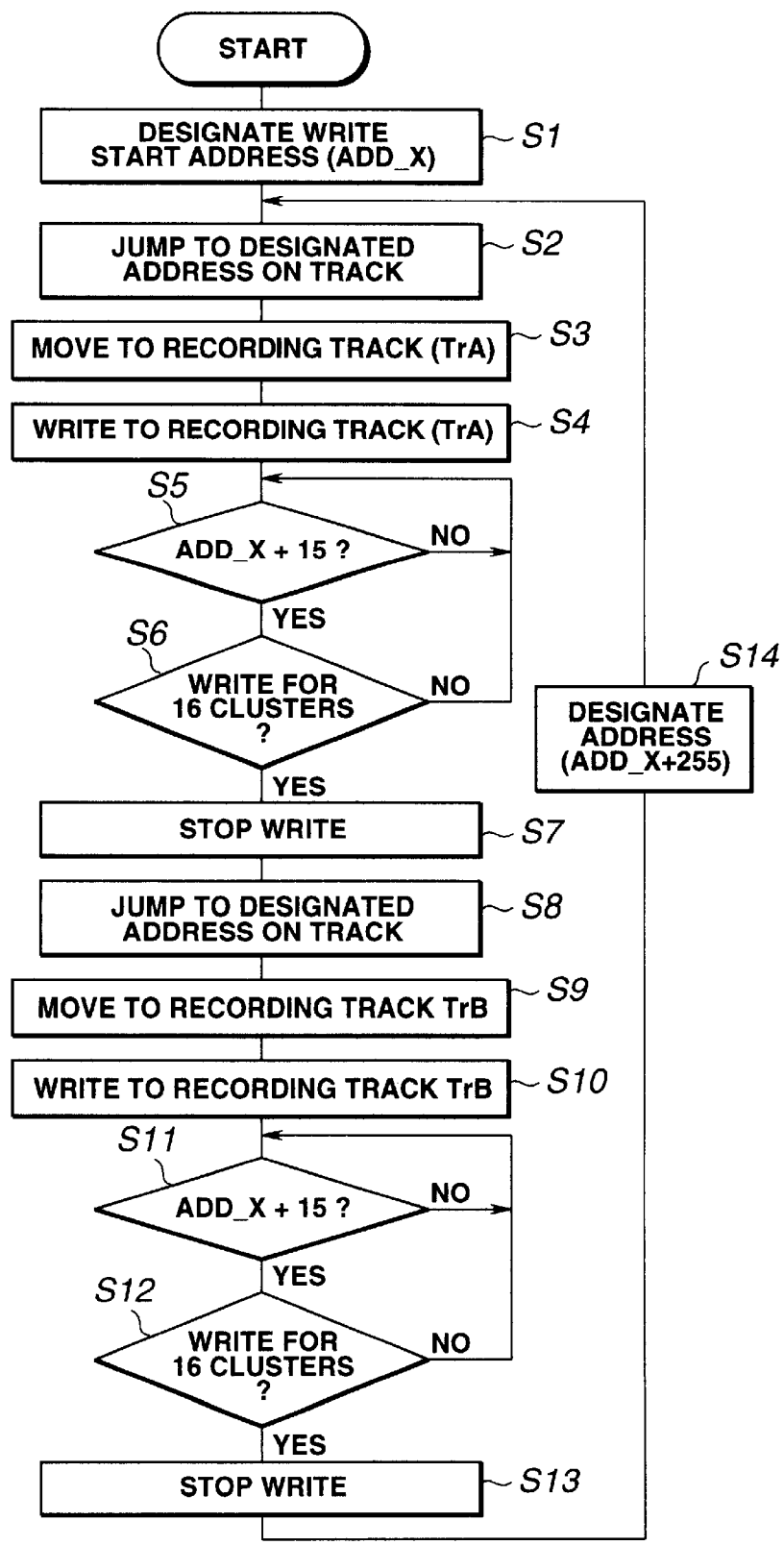
FIG. 6 is a flow chart of recording operations in the first embodiment of the recording method according to the present invention.

Data write by the magneto-optical disc drive unit 2 to the recording track TrA or TrB as switched at every 16 clusters, will be described herebelow with reference to FIG. 6. Note that a physical address in each sector of the magneto-optical disc 1 is represented by ADD_X.

First, when a data writing operation is started, the system controller 30 designates a write start address (ADD_X) based on a control information supplied from an external device at step S1. Then, the system controller 30 gives a track jump instruction to the servo controller 28 to let the optical head 12 and magnetic head 11 make a track jump to the write start address (ADD_X) at step S2. Next, the system controller 30 moves the optical head 12 and magnetic head 11 to the lead-in side recording track TrA at the write start address (ADD_X) at step S3, and lets the heads start writing data at the write start address (ADD_X) at step S4.

Then at step S5, the system controller 30 monitors an address information detected by the ADIP decoder 29 to judge whether data has been written down to an address (ADD_X+15) 16 sectors ahead of the write start address (ADD_X). Next, if the system controller 30 judges that the data has been written down to the address 16 sectors ahead (ADD_X+15), namely, when the system controller 30 judges that data has been written for one cluster, it will further judge at step S6 whether data has been written for 16 clusters.

If the system controller 30 judges that data has not yet been written for 16 clusters, it will repeat the operations from step S5.

When the system controller 30 judges that data has been written for 16 clusters, that is, down to the predetermined switching position, it will control, at step S7, the optical head 12 and magnetic head 11 to stop writing data to the recording tack TrA.

Then at step S8, the system controller 30 gives a track jump instruction to the servo controller 28 which will thus allow the optical head 12 and magnetic head 11 to make a track jump to the write start address (ADD_X).

At step S9, the system controller 30 controls the servo controller 28 to move the optical head 12 and magnetic head 11 to the lead-out side recording track TrB at the write start address (ADD_X). Then at step S10, the system controller 30 allows the optical head 12 and magnetic head 11 to start writing data to the recording track TrB from the write start address (ADD_X).

Further the system controller 30 monitors an address information detected by the ADIP decoder 29 to judge, at step S11, whether data has been written down to an address (ADD_X+15) 16 sectors ahead of the write start address (ADD_X) to. If the system controller 30 judges that data has been written down to the address 16 sectors ahead (ADD_X+15), namely, for one cluster, it judges, at step S12, whether data has been written for 16 clusters.

If the system controller 30 judges that data has not yet been written for 16 clusters, it will repeat the operations from step S11.

If the system controller 30 judges that data has been written for 16 clusters, that it, down to the predetermined switching position, it will control, at step S13, the optical head 12 and magnetic head 11 to stop writing data to the recording track TrB.

When data has been written to both the recording tracks TrA and TrB for 16 clusters, respectively, the system controller 30 will designate, at step S14, an address (ADD_X+255) 16 clusters ahead of the designated address (ADD—X), and repeat the operations from step S2.

By effecting the operations ranging from steps S1 to S14, the magneto-optical disc drive unit 2 can efficiently record data to the magneto-optical disc 1, and easily discriminate the switching point for each of the recording tracks.

Thus the magneto-optical disc drive unit 2 can write data sequentially from the lead-in (or lead-out) area on the magneto-optical disc 1. Therefore, when a predetermined amount of data has been written to the magneto-optical disc 1, a whole area outside or inside an address can be taken as a non-written area.

Thus, when an additional data is written to the magneto-optical disc 1, the data is written into the non-written area. Therefore, the magneto-optical disc drive unit 2 may not possibly write such an additional data over a data already written in the magneto-optical disc 1 to erase the existing data even if the writing position is misregistered due to a disturbance or the like when writing the additional data.

By effecting the operations ranging from steps S1 to S14, the magneto-optical disc drive unit 2 can efficiently write data to the magneto-optical disc 1, thereby improving the transfer rate for data write.

Figure 7:
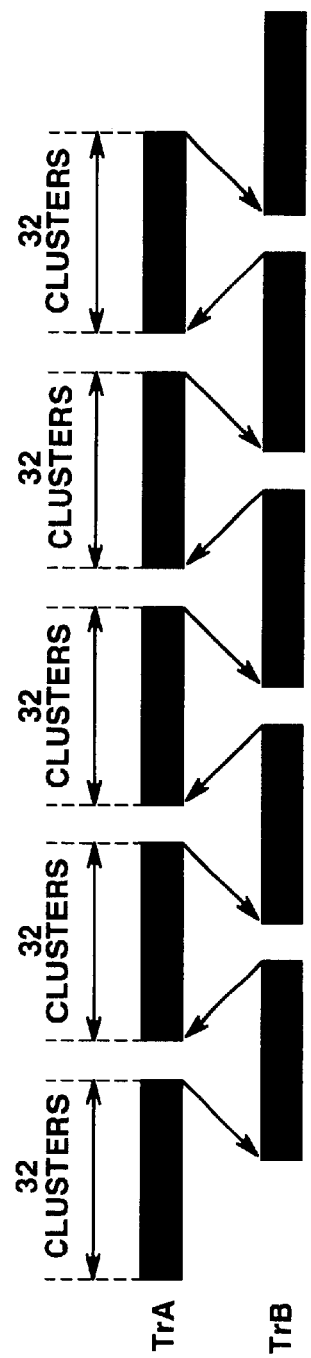
FIG. 7 is a schematic illustration of a variant of the first embodiment of the recording method according to the present invention.

In the foregoing, data write to the recording tracks TrA and TrB switched alternately at each predetermined track length has been described. However, the switching position is not limited only to the predetermined track length. A data write to the recording tracks TrA and TrB switched alternately at each variant of track length will be described herebelow:

As shown in FIG. 7, the magneto-optical disc drive unit 2 may be adapted to write data to the recording tracks TrA and TrB, at different write start addresses, as switched alternately at each predetermined track length (for 32 clusters, for example). For example, when the write start address being a first switching position on the recording track TrA is ADD_X, the write start address being a second switching position on the recording track TrB may be set ADD_X+8, the write start address being a second switching position on the recording track TrA may be set ADD_X+32, and the write start address being a second switching position on the recording track TrB may be set ADD_X+40. By starting data write to a switched one of the recording tracks at a position corresponding to a predetermined position between a write start position at which data write to a recording track yet to be switched is started and a write end position at which data write to the recording track yet to be switched is ended, the time for shift between the recording tracks can be reduced relatively, thereby further improving the transfer rate for data write.

Also, the magneto-optical disc drive unit 2 may be adapted so that switching is done between the recording tracks TrA and TrB each time data has been written to a length equivalent to a predetermined radial length of the magneto-optical disc 1, for example, 200 µm. Also, the magneto-optical disc drive unit 2 may be adapted so that switching is done each time data has been written to a length equivalent to 200 turns of the recording track, for example. By setting the switching point such that it can be followed only by the tracking servo system, switching between the recording tracks TrA and TrB can be done rapidly with no load to the sled servo system.

Note that also in this case, data write to a switched one of the recording tracks TrA and TrB may be started at a position corresponding to a predetermined position between a write start position at which data write to a recording track yet to be switched is started and a write end position at which data write to the recording track yet to be switched is ended, as shown in FIG. 7.

Further, the magneto-optical disc drive unit 2 may be adapted so that for recording audio data, switching between the recording tracks TrA and TrB is done each time a breakpoint set according to the content or the like of the data.

For example, the magneto-optical disc drive unit 2 may be adapted so that switching between the recording tracks TrA and TrB is done at every second when audio data is recorded or at every so-called sound unit when audio data compressed by the ATRAC method is recorded. For recording video data, the magneto-optical disc drive unit 2 may be adapted so that switching between the recording tracks TrA and TrB is done at every breakpoint set according to the content or the like of the video data.

For example, the magneto-optical disc drive unit 2 may be adapted so that switching between the recording tracks TrA and TrB is done at every integral multiple of the number of frames or at every so-called GOP when a video data compressed by the MPEG is recorded.

By setting a switching point based on the breakpoint of audio data and video data to be written to the magneto-optical disc 1, it is possible to easily identify the switching point even for reproducing the magneto-optical disc and edit the recorded data.

Also in this case, data write to a switched one of the recording tracks TrA and TrB may be started at a position corresponding to a predetermined position between a write start position at which data write to a recording track yet to be switched is started and a write end position at which data write to the recording track yet to be switched is ended, as shown in FIG. 7.

As aforementioned, the magneto-optical disc drive unit 2 of the present invention can record data to the double-spiral type magneto-optical disc 1 efficiently.

The magneto-optical disc drive unit 2 can easily identify the switching point for each of the recording tracks for data reproduction as well as for data recording, so a recorded data can be edited easily. Since the magneto-optical disc drive unit 2 can efficiently record data to the magneto-optical disc 1, data can be transferred at a higher rate.

The present invention has been described in the foregoing concerning the magneto-optical disc drive unit 2 adapted to write data to the double-spiral type magneto-optical disc 1. However, the present invention is not limited to data recording to such a double-spiral type magneto-optical disc, but can be applied to data recording to a magneto-optical disc having spiral recording tracks of which the number is not limited.

4. Second Embodiment of the Present Invention

Figure 8:
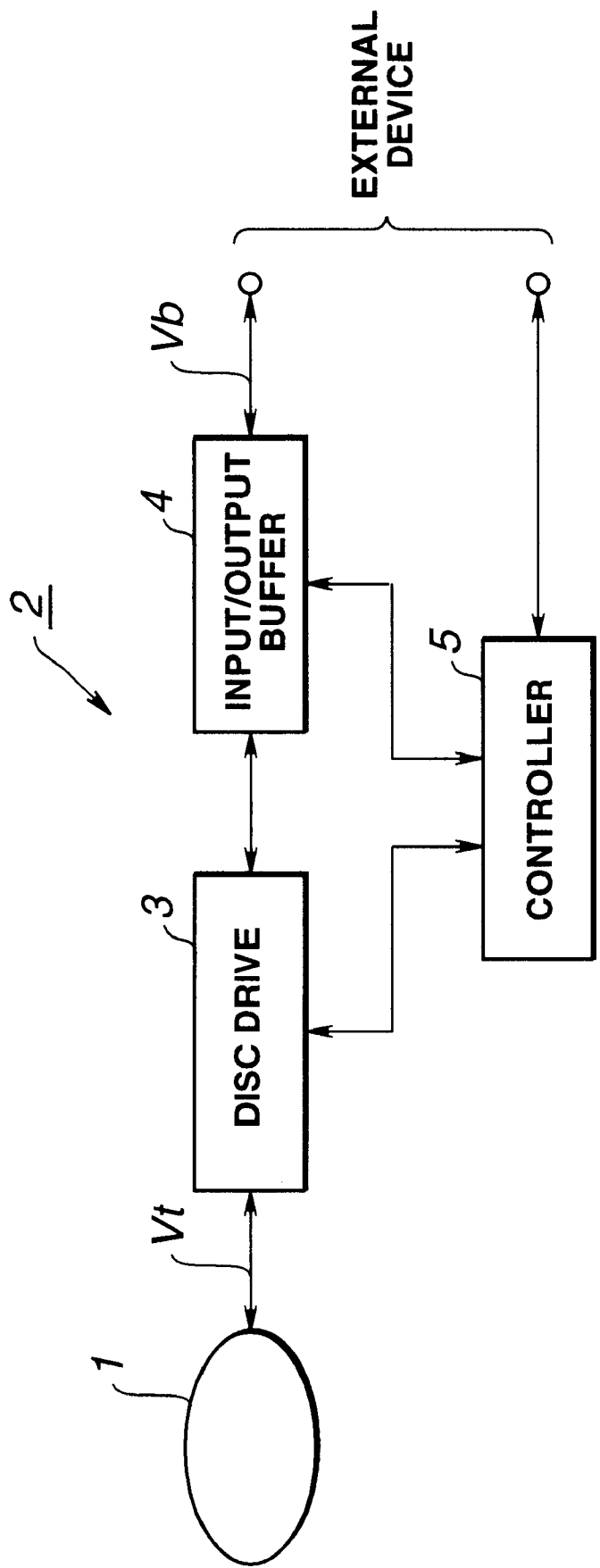
FIG. 8 is a schematic block diagram of a second embodiment of the present invention.

Next, how to switch the recording tacks from TrA to TrB or vice versa in the magneto-optical disc drive unit 2 of the present invention will be described herebelow:

As shown in FIG. 8, it is assumed that the bit rate of to-be-recorded data supplied continuously to the input/output buffer 4 from an external device such as a camera, video tape recorder, satellite broadcasting set top box (STB), etc. and that of reproduced data supplied continuously from the input/output buffer 4 to an external device, are a transfer rate Vb.

Also, the bit rate of data written by a disc drive 3 to the magneto-optical disc 1 and that of data reproduced by the disc drive 3 from the magneto-optical disc 1 are a write rate Vt.

It is assumed that the relation between the transfer rate Vb and write rate Vt is Vt>Vb.

In the magneto-optical disc drive unit 2, as the disc drive 3 starts recording, data is supplied at the transfer rate Vb to the input/output buffer 4 from an external device.

Thus, data is stored into the input/output buffer 4 at the transfer rate Vb.

When a predetermined time Tj passes from the start of data storage into the input/output buffer 4, the input/output buffer 4 will start supplying data to the disc drive 3. The data is written to the magneto-optical disc 1 at the write rate Vt.

The data amount stored in the input/output buffer 4 decreases at a rate of Vt −Vb, and will be zero when a time Tx passes. This relation is expressed by a following equation (1):

$$Tj \times Vb = Tx \times (Vt-Vb) \qquad (1)$$

This equation (1) means that if data is continuously recorded to one recording track for the time Tx, the continuous recording at the write rate Vt is assured even if the recording is stopped for the time Tj.

Since the rate Vt of write to the magneto-optical disc 1 is constant, there exists between the elapsed time Tx and number B of clusters to which data is written a constant proportional relation expressed by a following equation (2):

$$B = (Tx \times Vt)/C \qquad (2)$$

where C: Number of bits included in one cluster.

Therefore, a relation represented by a following equation (3) can be determined from the above equations (1) and (2):

$$B(Tj \times Vb \times Vt)/\{C \times (Vt-Vb)\} \qquad (3)$$

A data amount X continuously recorded meets a relation expressed by a following equation (4) unless the cluster is taken in consideration:

$$X = (Tj \times Vb \times Vt)/(Vt-Vb) \qquad (4)$$

That is, if at least B clusters or X bits or more of data are continuously recorded to one recording track, the continuous recording at the transfer rate Vb is assured even if the recording is stopped for the time Tj.

Since the magneto-optical disc 1 has a double spiral, the magneto-optical disc drive unit 2 switches the lead-in side recording track TrA and lead-out side recording track TrB between them alternately at a suitable time.

At this time, the magneto-optical disc drive unit 2 records more than clusters of data, defined by the equation (3), to one of the recording tracks (TrA or TrB), and then switches the recording track to the other (TrB or TrA).

The magneto-optical disc drive unit 2 thus records data to the recording track timely selected, so that data is not unevenly recorded to one of the recording tracks but data can sequentially be recorded evenly to both the two recording tracks from the lead-in area or lead-out area of the magneto-optical disc 1.

Therefore, when a predetermined amount of data is recorded to the magneto-optical disc 1, the area inside or outside an address can be taken as a non-written area in which no data is recorded.

Thus, an additional data is recorded to the magneto-optical disc 1, it is written to this non-written area.

Therefore, even if an additional data thus recorded is misregistered due to a disturbance, it will not be written over an existing data in the magneto-optical disc 1. Namely, the existing data will not be erased by mistake.

In the magneto-optical disc drive unit 2, after a number of clusters of data, meeting the relation (3), is continuously written to one of the recording tracks, switching is made between the tracks TrA and TrB, thereby assuring the continuity of a data supplied from an external device to the input/output buffer 4.

That is, in the magneto-optical disc drive unit 2, data can be transferred at the rate Vb by making a selection between the recording tacks TrA and TrB after more clusters of data than defined by the equation (3) are recorded to one recording track taking it in account that the time Tj is required for shift from one to the other recording track.

Therefore, in the magneto-optical disc drive unit 2, data can be supplied at a higher data rate from an external device to the disc drive 3, so that an application requiring a high data rate, for example, an moving picture data or the like, can be recorded on the real-time basis.

Taking account of the time Tj for shift from one to the other recording track, will increase the stability of the entire system.

Thus in the magneto-optical disc drive unit 2, data transferred at a first transfer rate is stored, stored data is recorded at a second transfer rate higher than the first transfer rate to a magneto-optical disc having a plurality of spiral, parallel recording tracks formed thereon, a data amount which can continuously be transferred at the first transfer rate to one of the recording tracks based on a shift time at which a track switching is made, first and second transfer rates, and then a recording track is selected for write of data to the track.

In the magneto-optical disc drive 2, switching between the plurality of parallel recording tracks is made according to the relation between the shift time, first and second transfer rates to assure a continuous data transfer at the first transfer rate, thereby recording data to all the recording tracks.

Further to accommodate a data for write to the magneto-optical disc 1 having some logical structure, the magneto-optical disc drive unit 2 may be adapted to make switching between the recording tracks at every logical structure of the data.

The logical structure is a field or frame when the data to be recorded is a picture data for example. It is GOP (group of picture) when the data is a picture data compressed by the MPEG. Also, it is a sound unit when the data is an audio data compressed by the so-called ATRAC (adapted transform acoustic coding) method. By switching the recording track at every logical structure of a data to be written to the magneto-optical disc 1, access to the disc 1 can be improved.

Figure 9:
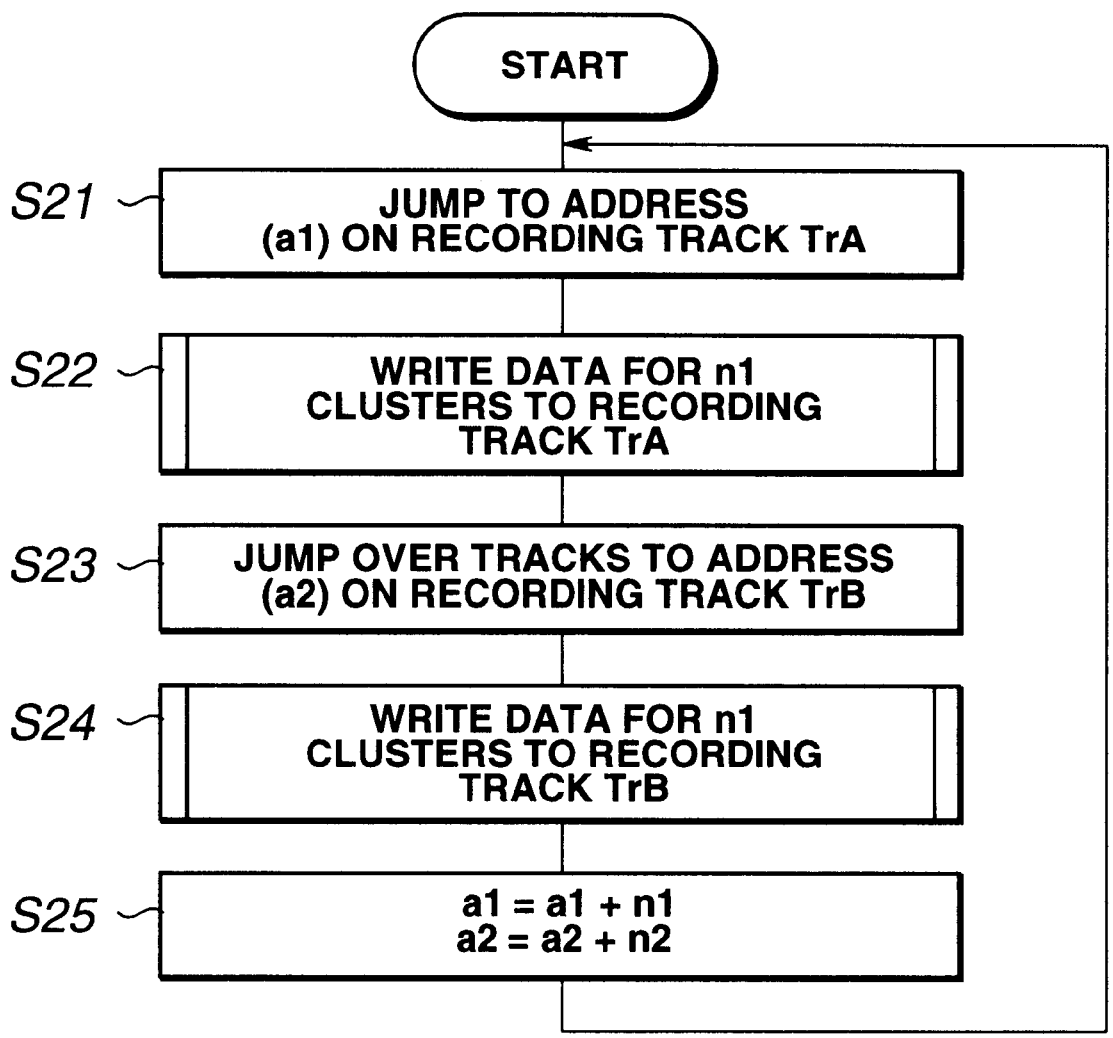
FIG. 9 is a flow chart of track changing operations during recording in the second embodiment of the present invention.
Figure 10:
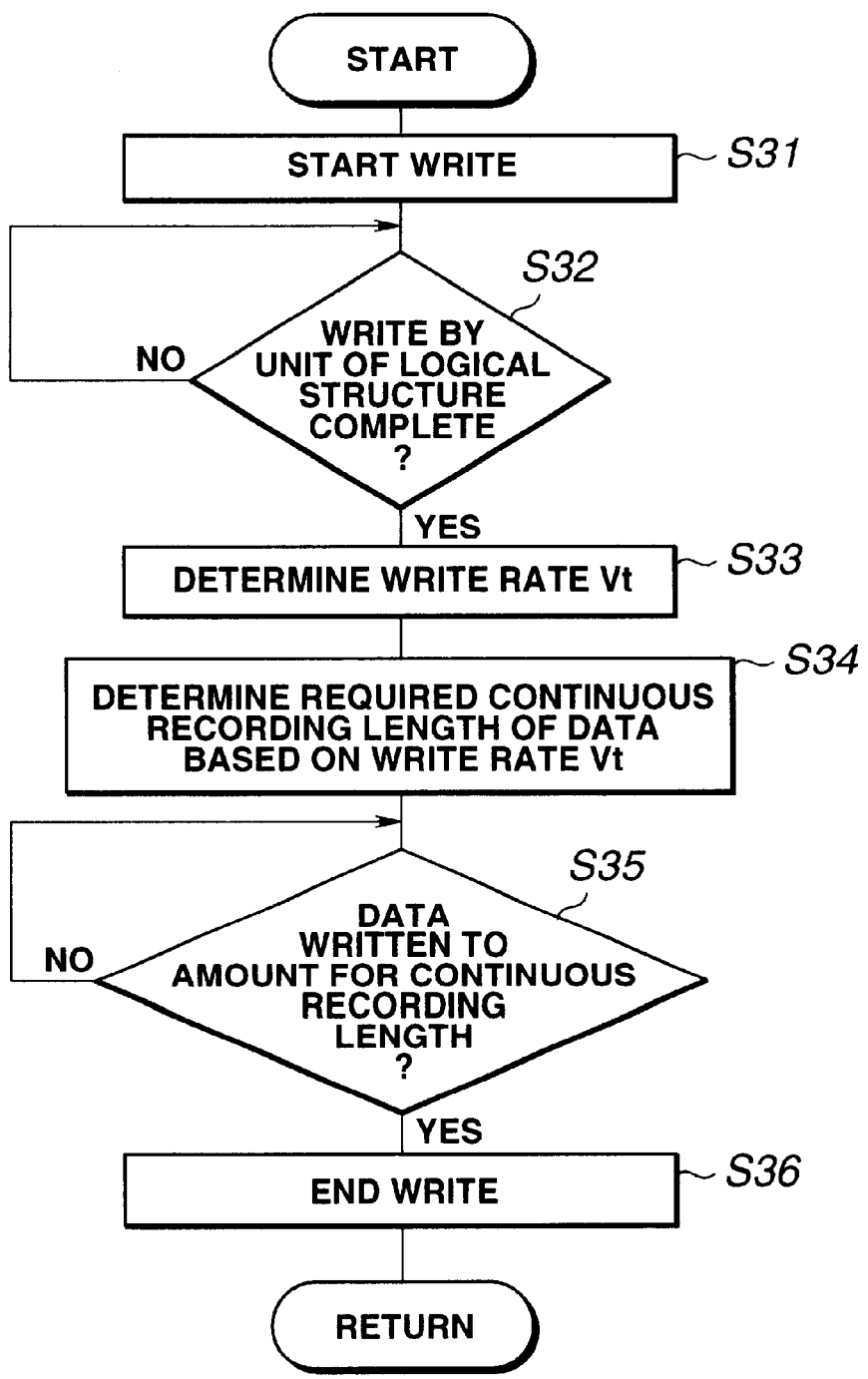
FIG. 10 is a flow chart of track changing operations in the recording method according to the present invention.

Next, switching between the recording tracks TrA and TrB by the magneto-optical disc drive unit 2 will be described herebelow with reference to the flow charts in FIGS. 9 and 10:

Note that the flow chart in FIG. 10 shows in detail steps S22 and S24 in the flow chart in FIG. 9.

When supply of data from an external device to the input/output buffer 4 is started, the controller 5 of the magneto-optical disc drive unit 2 effects operations at steps S21 to S25.

First at step S21, the controller 5 will give a control instruction to the disc drive 3 for jumping the magnetic head 11 and optical head 12 to a predetermined address (a1) on the recording track TrA.

Next at step S22, the disc drive 3 given the control instruction will record a predetermined number of clusters (n1) starting at the address (a1) on the recording track TrA. At this time, the controller 5 will effect operations at steps S3 1 to S36 in FIG. 10.

First at step S31, the controller 5 will give a data write start instruction to the disc drive 3. Then, at step S32, the controller 5 will judge whether the disc drive 3 has completed a write in each predetermined logical structure.

If the controller 5 judges that the disc drive 3 has completed the write in the predetermined logical structure, it will determine, at step S33, the write rate Vt at which the data has been written to the recording track TrA. Then at step S34, the controller 5 will determine, based on the write rate Vt, a continuous write length of a data to be written to one of the recording tracks, that is required for assuring the write rate Vt.

That is, the controller 5 determines a number of clusters defined by the equation (3). Next at step S35, the controller 5 judges whether the data amount written to the recording track TrA has reached the continuous write length.

That is, the controller judges whether more clusters than determined at step S34 have been recorded.

If the controller 5 judges that the data amount written to the recording track TrA has reached the continuous write length, it will give a write end instruction for ending data write to the recording track TrA. At this time, the number of clusters written to the recording tack TrA is n1.

Next at step S23, the controller 5 will give the disc drive 3 a control instruction for jumping the magnetic head 11 and optical head 12 to a predetermined address (a2) on the recording track TrB. The address (a2) is a one near the address (a1).

Then at step S24, the disc drive 3 given the control instruction will record a predetermined number of clusters (n2) starting at the address (a2) on the recording track TrB.

At this time, the controller 5 will effect operations at step S31 to S36 in FIG. 10.

First at step S31, the controller 5 will give the disc drive 3 a data write start instruction. At step S32, the controller 5 will judge whether the disc drive 3 has completed a write in each predetermined logical structure. If the controller 5 judges that the disc drive 3 has completed the write, it will determine, at step S33, the write date Vt at which data has been written to the recording track TrB. Next at step S34, the controller 5 will determine, based on the write rate Vt, a continuous write length of a data to be written to the recording track TrB, that is required for assuring the write rate Vt. That is, the controller 5 will determine the number of clusters defined by the equation (3).

Next at step S35, the controller 5 will judge whether the data amount written to the recording track TrA has reached the continuous write length.

That is, the controller 5 will judge whether more clusters than determined at step S34 have been written. If the controller 5 judges that the data amount written to the recording track TrB has reached the continuous write length, it will give, at step S36, a write end instruction for ending the write of data to the recording track TrB. At this time, the number of clusters written to the recording track TrB is n2.

Next at step S25, the controller 5 will add an address for the number of clusters (n1) written at step S2 to the address (a1) on the recording track TrA, and an address for the number of clusters (n2) written at step S4 to the address (a2) on the recording track TrB. Then the controller 5 will repeat the operations at step S21 and subsequent steps.

As in the above, for a magneto-optical disc 1 used in the magneto-optical disc drive unit 2, a continuous write length of write to one of the recording tracks is determined from the write rate Vt at which data has been written to the recording tack and a data amount which can continuously be transferred at the write rate Vt is determined.

After writing a data longer than the continuous write length to one of the recording tracks, the magneto-optical disc drive unit 2 switches to the other recording track for further data write.

Thus, the magneto-optical disc drive unit 2 can efficiently record data to the magneto-optical disc 1 and transfer data at a higher rate from an external device to the input/output buffer 4.

Also the magento-optical disc drive unit 2 records, in a disc management area such as TOC (table of contents) for example, an information on a point of switching between the recording tracks TrA and TrB, namely, an information on linkage between the recording tracks TrA and TrB. Thus, at data reproduction, the switching point can easily be identified and a continuous data can be reproduced.

In the magneto-optical disc drive unit 2, data is read from the magneto-optical disc 1 at a rate higher than the write rate Vt based on the information on the point of switch between the recording tracks TrA and TrB, so that the data can surely be transferred to an external device at the transfer rate Vb.

Next, switching between the recording tracks TrA and TrB and other recording tracks in the magneto-optical disc drive unit 2 of the present invention, will be described herebelow:

In the magneto-optical disc drive unit 2, when the disc drive 3 starts data writing operation, data is supplied from an external device to the input/output device 4 at the transfer rate Vb.

Thus, data is stored into the input/output buffer 4 at the data Vb. When a larger data amount then a threshold (first threshold) has been stored in the input/output buffer 4, supply of data from the input/output buffer 4 to the disc drive 3 is started, and data is written to the magneto-optical disc 1 at the write rate Vt.

At this time, the data amount stored in the input/output buffer 4 decreases at a rate (Vt–Vb), and finally becomes zero in a certain time.

Thus, in the magneto-optical disc drive unit 2, the data amount stored in the input/output buffer 4 is managed by the controller 5. The controller 5 stops supply of data from the input/output buffer 4 to the disc drive 3 when the data amount stored in the input/output buffer 4 becomes below a predetermined threshold (second threshold).

In the magneto-optical disc drive unit 2, since data is continuously supplied from an external device to the input/output buffer 4 even while data supply from the input/output buffer 4 to the disc drive 3 is being stopped, the data amount stored in the input/output buffer 4 increases at the rate Vb. When the predetermined amount (first threshold) of data has been stored in the input/output buffer 4, data supply from the input/output buffer 4 to the disc drive 3 is resumed and data is written to the write rate Vt to the magneto-optical disc 1.

By repeating the above operations, the magneto-optical disc drive unit 2 can assure data transfer from an external device to the input/output buffer 4, thereby permitting to avoid the breakdown of the input/output buffer 4.

In the magneto-optical disc drive unit 2, switching between the recording tracks TrA and TrB is done while data supply from the input/output buffer 4 to the disc drive 3 is being stopped. Therefore, data write to the magneto-optical disc 1 is not interfered by the switching between the recording tracks TrA and TrB, so an efficient switching can be done between the recording tracks.

Next, track switching for data read will be described herebelow:

In the magneto-optical disc drive unit 2, the disc drive 3 drives to spin the magneto-optical disc 1 at a constant linear velocity, reads for a predetermined time, stores the read data to the input/output buffer 4 at the write rate Vt, and sends data from the input/output buffer 4 to an external device at a slower transfer rate Vb than the write rate Vt. Of course, the transfer rate at which the data is supplied from the disc drive 3 to the input/output buffer 4 depends upon the spinning speed (linear velocity) of the magneto-optical disc 1.

When the data amount stored in the input/output buffer 4 is more than a predetermined threshold (nearly full), the read from the magneto-optical disc lis ceased. Namely, an intermittent write is done.

In the magneto-optical disc drive unit 2, when the data amount stored in the input/output buffer 4 is greater than the predetermined value during the intermittent write mode, switching is made from one of the recording tracks to the other.

Figure 11:
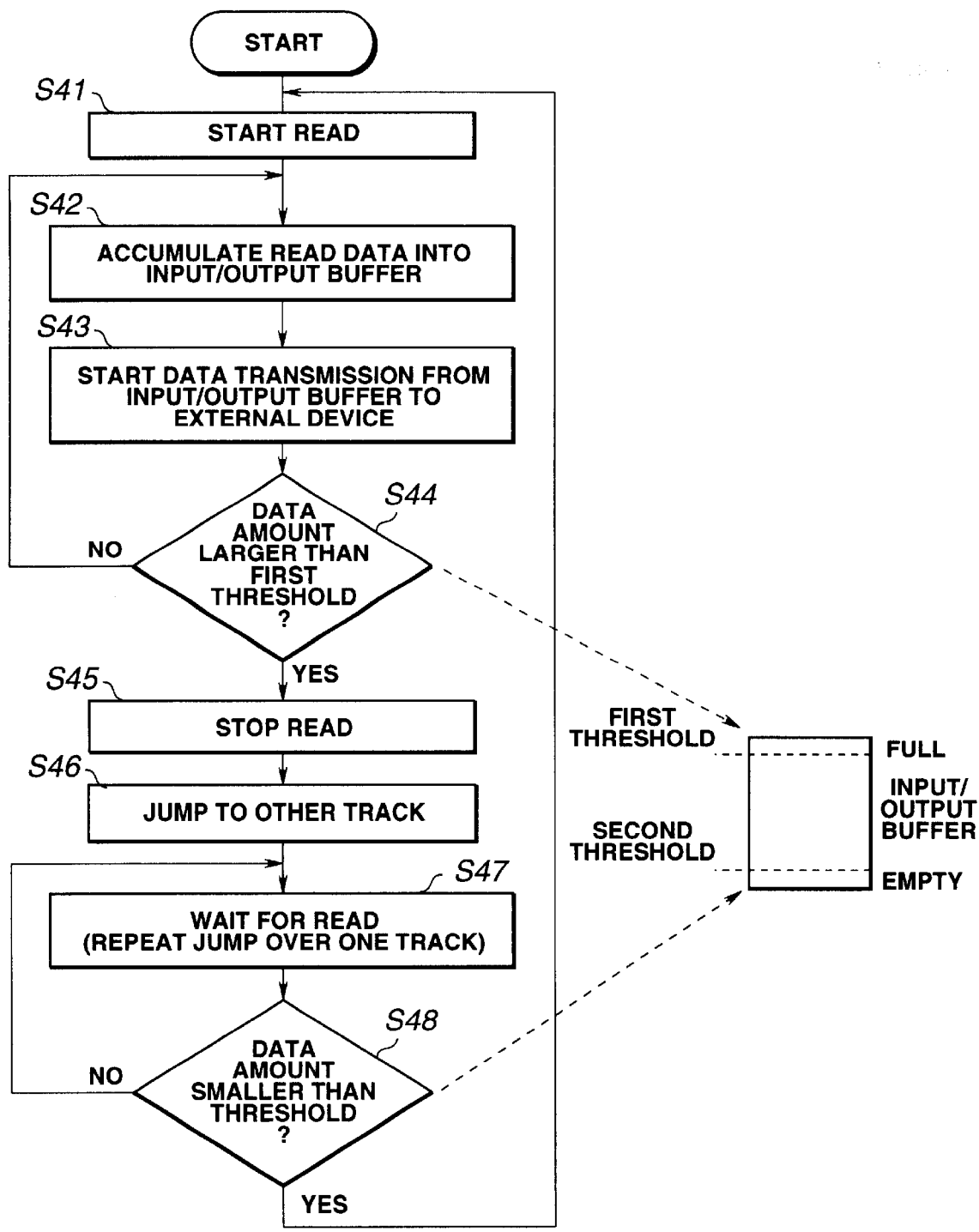
FIG. 11 is a flow chart of track changing operations in the reproducing method according to the present invention.

The read control will be described herebelow with reference to the flow chart in FIG. 11:

First at step S4 1, when a read instruction is given, data read starts at one of the spiral recording tracks on the disc (TrA, for example).

Next at step S42, data read from the magneto-optical disc 1 is stored into the input/output buffer 4.

At step S43, read data stored in the input/output buffer 4 is delivered at a slower transfer rate Vt than the write rate Vb.

At step S44, the controller 5 judges whether the data amount stored in the input/output buffer 4 is over the first threshold. If it is judged at step S44 that the data amount in the input/output buffer 4 is smaller than the first threshold, the controller 5 returns to step S42 and continues storing the read data into the input/output buffer 4.

If it is judged at step S44 that the data amount in the input/output buffer 4 is over the first threshold, read-out of data f from the magneto-optical disc 1 is stopped at step S45.

Next at step S46, the magnetic head 11 and optical head 12 are jumped from one of the recording track to which data write has been done (TrA, for example) to the other recording track TrB.

At step S47, data read is awaited (namely, one track jump is repeated). At next step S48, the controller 5 will judge whether the data amount stored in the input/output buffer 4 is under the second threshold (smaller than the first threshold). If the data amount in the input/output buffer 4 is judged to be under the second threshold, the controller 5 will return to step S41 and repeat the operations at step S41 and subsequent steps.

If the controller 5 judges that the data amount in the input/output buffer 4 is larger than the second threshold, it will return to step S47 and repeat the wait for data reading operation.

As having been described in the foregoing, in the magneto-optical disc drive unit 2, the data read from the magneto-optical disc 1 is not interfered by the switching between the recording tracks TrA and TrB, so the track switching can be done efficiently.

The embodiments of the present invention have been described in the foregoing concerning a disc drive 3 adapted to write data to a magneto-optical disc 1 having a double spiral-formed recording tracks formed thereon. However, the present invention is not limited to such a type of magneto-optical disc but is applicable to a magneto-optical disc having formed thereon spiral or circular recording tracks of which the number is not limited. Also, the present invention is applicable to a disc-shaped recording medium such as a magnetic disc or the like.

The magneto-optical disc recording apparatus and method according to the present invention are adapted to write data to all a plurality of recording tracks switched between them at every predetermined switching point. Thus, the present invention can attain an efficient data write to a magneto-optical disc having a plurality of parallel, spiral recording tracks formed thereon. Also, the present invention can identify each track switching point easily. Also for data read from a magneto-optical disc, the present invention can easily identify each track switching point and edit written data. Further, since the present invention permits to write data to a magneto-optical disc efficiently, it can also transfer to-be-written data at a higher rate.

The magneto-optical disc drive according to the present invention, when data amount in a storage means reaches a predetermined value the data stored in the storage means is read out at a higher second rate than the first transfer rate. When the data amount in the storage means is smaller than the predetermined value, the data read-out from the storage means is stopped. While the data read-out from the storage means is being stopped, the read head is jumped from one of the pair of recording tracks to the other. Also, in the disc reproducing apparatus according to the present invention, when the data amount in the storage means is less than the predetermined value, data read from one of the recording tracks on the disc is stopped and the read head is allowed to access the other adjacent recording track while the data read is being stopped.

Thus, the present invention permits to write data to a magneto-optical disc having a plurality of parallel, spiral recording tracks formed thereon by switching the tracks efficiently. Therefore, the present invention permits to write or read data to the magneto-optical disc, and thus minimize the influence on the data transfer rate of the shift of the read head or the like from one to the other of the recording tracks.

What is claimed is:

1. A recording method in which data is written to a disc having formed thereon a pair of concentric or spiral tracks adjacent to each other and to which a common address is given, comprising the steps of:
   a) writing a data blocked to a predetermined length to one of the pair of tracks;
   b) accessing the other track having the common address after the writing of the data blocked to the predetermined length to the one track;
   c) writing a new data blocked to the predetermined length to the other one of the pair of tracks;
   d) accessing the one track having the common address after the writing of the new data blocked to the predetermined length to the other of the pair of tracks; and
   e) repeating the steps a), b), c) and d) until a recordable region on the pair of concentric or spiral tracks is consumed.

2. The recording method as set forth in claim 1, wherein one of the pair of tracks is a land of which one wall face is wobbled at a predetermined period while the other wall face is flat.

3. The recording method as set forth in claim 2, wherein the other one of the pair of tracks is a land of which one wall face is flat while the other wall face is wobbled at a predetermined period.

4. The recording method as set forth in claim 1, wherein the predetermined blocking length is an integral multiple of the error correction unit.

5. A recording apparatus adapted to write data to a disc having formed thereon a pair of concentric or spiral tracks adjacent to each other and to which a common address is given, comprising:
   means for blocking an input data to a predetermined length;
   means for writing the blocked data to the disc;
   means for accessing the tracks; and
   means for controlling the accessing means to access one of the pair of tracks and the writing means to write the blocked data to the one track, and then to control the accessing means to access the other one of the pair of tracks that has the common address after the writing to the one track and to control the writing means to write a new data blocked to the predetermined length to the other track, and to control the accessing and writing means to alternately access and write to the one track and the other track until a recordable region on the pair of concentric or spiral tracks is consumed.

6. The recording apparatus as set forth in claim 5, further comprising:
   a memory means for storing an input data once therein; and
   a scale controlling means for intermittently reading out data stored in the memory means;
   the memory means compensating a data entered while the reading means is being moved from one of the pair of tracks to the other one of the pair of tracks.

7. The recording apparatus as set forth in claim 5, wherein one of the pair of tracks is a land of which one wall face is wobbled at a predetermined period while the other wall face is flat.

8. The recording apparatus as set forth in claim 6, wherein the other one of the pair of tracks is a land of which one wall face is flat while the other wall face is wobbled at a predetermined period.

9. The recording apparatus as set forth in claim 5, wherein the predetermined blocking length is an integral multiple of the error correction unit.

10. A recording apparatus adapted to write data to a disc having formed thereon a pair of concentric or spiral tracks adjacent to each other and to which a common address is given, comprising:
    a memory means for storing an input data once at a first transfer rate;
    a memory controlling means for detecting when the data amount stored in the memory means has exceeded a first predetermined value, reading out data from the memory means at a second transfer rate higher than the first transfer rate and stopping the data read-out from the memory means when the data amount stored in the memory means has reached a second predetermined value smaller than the first predetermined value;
    a writing means for writing data read out from the memory means;
    a recording means movement controlling means for moving, while the data read-out from the memory means is being stopped, the writing means from one of the pair of tracks to which the data read out from the memory means has been written to the other one of the pair of tracks; and
    a writing means controlling means for stopping the writing means from writing while the data read-out from the memory means is being stopped.

11. The recording apparatus as set forth in claim 10, wherein one of the pair of tracks is a land of which one wall face is wobbled at a predetermined period while the other wall face is flat.

12. The recording apparatus as set forth in claim 11, wherein the other one of the pair of tracks is a land of which one wall face is flat while the other wall face is wobbled at a predetermined period.

13. A reproducing apparatus adapted to read data from a disc having formed thereon a pair of concentric or spiral tracks adjacent to each other and to which a common address is given, comprising:
    means for reading data from the disc;
    a memory means for storing the data read out from the memory means once at a first transfer rate;
    a memory controlling means for detecting when the data amount stored in the memory means has exceeded a first predetermined value, reading out data from the memory means at a second transfer rate higher than the first transfer rate and stopping the data storage into the memory means when the data amount stored in the memory means has reached a second predetermined value smaller than the first predetermined value; and
    a reading means movement controlling means for moving, while the data storage into the memory means is being stopped, the reading means from one of the pair of tracks from which the data has been read to the other one of the pair of tracks.

14. The recording apparatus as set forth in claim 13, wherein one of the pair of tracks is a land of which one wall face is wobbled at a predetermined period while the other wall face is flat.

15. The recording apparatus as set forth in claim 14, wherein the other one of the pair of tracks is a land of which one wall face is flat while the other wall face is wobbled at a predetermined period.

16. A recording method in which data is written to a disc having formed thereon a pair of concentric or spiral tracks adjacent to each other and to which a common address is given, comprising the steps of:

storing an input data into a memory at a first transfer rate;

firstly judging that the data amount stored in the memory has reached a first predetermined value;

reading out data from the memory at a second transfer rate higher than the first transfer rate when it is judged at the first judging step that the data amount stored in the memory has reached the first predetermined value;

secondly judging that the data amount stored in the memory has reached a second predetermined value smaller than the first predetermined value;

stopping the data read-out from the memory when it is judged at the second judging step that the data amount stored in the memory has reached the second predetermined value;

moving a write head from one of the pair of tracks to which data has been written to the other one of the pair of tracks while the data read-out from the memory is being stopped; and stopping the write head from writing while the data read-out from the memory is being stopped.

17. A reproducing method in which data is read from a disc having formed thereon a pair of concentric or spiral tracks adjacent to each other and to which a common address is given, comprising:

reading data from the disc using a read head;

storing the data read out from the disc into a memory at a first transfer rate;

detecting when the data amount stored in the memory has exceeded a first predetermined value and reading out data from the memory at a second transfer rate slower than the first transfer rate;

stopping the data storage into the memory when the data amount stored in the memory has reached a second predetermined value larger than the first predetermined value; and moving, while the data storage into the memory is being stopped, the read head from one of the pair of tracks from which the data has been read to the other one of the pair of tracks.

* * * * *

UNITED STATES PATENT AND TRADEMARK OFFICE
CERTIFICATE OF CORRECTION

PATENT NO.     : 6,320,833 B1
DATED          : November 20, 2001
INVENTOR(S)    : Chiaki Nonaka et al.

It is certified that error appears in the above-identified patent and that said Letters Patent is hereby corrected as shown below:

Column 15,
Line 65, change "Vt" to -- Vb --.
Line 66, change "Vb" to -- Vt --.

Column 18,
Line 47, change "memory means" to -- disc --;
Line 51, change "higher" to -- slower --; and
Line 55, change "smaller" to -- larger --.

Signed and Sealed this

Twenty-seventh Day of July, 2004

JON W. DUDAS
*Acting Director of the United States Patent and Trademark Office*